United States Patent
Yoshino

(10) Patent No.: US 8,894,343 B2
(45) Date of Patent: Nov. 25, 2014

(54) CARRIER DEVICE AND ROBOT SYSTEM

(75) Inventor: Katsuhiko Yoshino, Kitayushu (JP)

(73) Assignee: Kabushiki Kaisha Yaskawa Denki, Kitakyushu-Shi (JP)

(*) Notice: Subject to any disclaimer, the term of this patent is extended or adjusted under 35 U.S.C. 154(b) by 190 days.

(21) Appl. No.: 13/607,807

(22) Filed: Sep. 10, 2012

(65) Prior Publication Data

US 2013/0259611 A1    Oct. 3, 2013

(30) Foreign Application Priority Data

Apr. 3, 2012 (JP) ................. 2012-084527

(51) Int. Cl.
*B65H 1/00* (2006.01)
*B25J 9/10* (2006.01)
*B05B 13/02* (2006.01)

(52) U.S. Cl.
CPC ............ *B05B 13/0242* (2013.01); *B25J 9/106* (2013.01)
USPC ................. 414/222.07; 414/223.01

(58) Field of Classification Search
CPC .......... B25J 9/042; B25J 9/102; B25J 9/1623; B25J 9/106; B25J 9/0096; B05B 13/0228; B05B 13/0242; B05B 13/0431
USPC ................. 414/222.07, 222.01, 226.05, 776, 414/223.01
See application file for complete search history.

(56) References Cited

U.S. PATENT DOCUMENTS

| 4,764,077 A * | 8/1988 | Susnjara | 414/222.03 |
| 5,386,762 A * | 2/1995 | Gokey | 414/225.01 |
| 2007/0243075 A1 | 10/2007 | Hirose et al. | |
| 2011/0222999 A1 * | 9/2011 | Kubota et al. | 414/590 |
| 2011/0288684 A1 * | 11/2011 | Farlow et al. | 901/47 |
| 2012/0039699 A1 * | 2/2012 | Ward et al. | 414/792.7 |
| 2012/0173018 A1 * | 7/2012 | Allen et al. | 700/245 |

FOREIGN PATENT DOCUMENTS

| JP | 4190631 B2 | 6/2000 |
| JP | 2000159338 A * | 6/2000 |
| JP | 2007229904 A * | 9/2007 |
| JP | 2008-221098 | 9/2008 |
| JP | 2008221098 A * | 9/2008 |
| JP | 2013-141732 | 7/2013 |

OTHER PUBLICATIONS

Extended European Search Report for corresponding EP Application No. 12188068.6-1712, Apr. 2, 2013.
Japanese Office Action for corresponding JP Application No. 2012-084527, Dec. 17, 2013.

* cited by examiner

*Primary Examiner* — Gerald McClain
(74) *Attorney, Agent, or Firm* — Mori & Ward, LLP

(57) ABSTRACT

A carrier device according to embodiments includes: a swivel arm that is provided on a base installed on an installation surface to be able to swivel around a central axis and whose leading ends can pass on a circular orbit; and turn tables that are attached to the leading ends of the swivel arm and can carry a predetermined workpiece while placing thereon the workpiece between a working position and a carrying in/out position provided on the circular orbit. The turn table is rotated by an integral multiple of 360 degrees with respect to the installation surface while the turn table is moving from the working position to the carrying in/out position by swiveling the swivel arm.

20 Claims, 12 Drawing Sheets

CARRIER DEVICE AND ROBOT SYSTEM

CROSS-REFERENCE TO RELATED APPLICATION

This application is based upon and claims the benefit of priority of the prior Japanese Patent Application No. 2012-084527, filed on Apr. 3, 2012, the entire contents of which are incorporated herein by reference.

FIELD

The embodiments discussed herein are directed to a carrier device and a robot system.

BACKGROUND

There is known a conventional carrier device that includes: a swivel arm of which both ends pass on a circular orbit; turn tables that are attached to both the ends of the swivel arm; and a table rolling mechanism that rotates the turn tables on their axes at positions at which they are attached to the swivel arm.

The conventional carrier device can carry a workpiece, while supporting the workpiece on the turn table, between a carrying in/out position and a working position that are symmetrical with respect to the center of the circular orbit. In other words, because the conventional carrier device can substantially simultaneously perform an operation for supplying one workpiece onto the turn table at the carrying in/out position and an operation for processing another workpiece at the working position, the carrier device can efficiently realize work operations.

The conventional technology has been known as disclosed in, for example, Japanese Patent No. 4190631.

However, the conventional carrier device has a configuration that the turn table is not rotated with respect to the arm during swiveling of the arm or a configuration that the turn table is not rotated with respect to the installation surface of the carrier device during swiveling of the arm. In the case of the latter configuration, the turn table is rotated 180 degrees in a direction opposite to the rotation direction of the arm while the turn table is moving between the working position and the carrying in/out position in accordance with swiveling of the arm. This reason is to always uniform the posture of the turn table between the working position and the carrying in/out position.

When the swivel arm of the carrier device is swiveled, the workpiece on the turn table is exposed to the wind due to the swiveling. In the conventional configuration, the workpiece is exposed to the biased wind.

Under such circumstances, when the surface of the workpiece is wet, dust or the like unevenly adheres to the partial surface of the workpiece. For example, when a processing operation is a painting operation, there is a possibility that a drying rate is different depending on the surface of the workpiece and thus the painting operation is not uniformly performed.

SUMMARY

A carrier device according to an aspect of embodiments includes a swivel arm whose leading ends can pass on a circular orbit and turn tables that are attached to the leading ends of the swivel arm. The swivel arm is provided on a base installed on an installation surface to be able to swivel around a central axis. The turn tables can carry a predetermined workpiece while placing thereon the workpiece between a working position and a carrying in/out position provided on the circular orbit. The turn table is rotated by an integral multiple of 360 degrees with respect to the installation surface while the turn table is moving from the working position to the carrying in/out position by swiveling the swivel arm.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

A carrier device according to an aspect of embodiments includes a swivel arm whose leading ends can pass on a circular orbit and turn tables that are attached to the leading ends of the swivel arm. The swivel arm is provided on a base installed on an installation surface to be able to swivel around a central axis. The turn tables can carry a predetermined workpiece while placing thereon the workpiece between a working position and a carrying in/out position provided on the circular orbit. The turn table is rotated by an integral multiple of 360 degrees with respect to the installation surface while the turn table is moving from the working position to the carrying in/out position by swiveling the swivel arm.

Hereinafter, a carrier device and a robot system according to embodiments of the present disclosure will be explained in detail with reference to the accompanying drawings. In addition, the embodiments disclosed below are not intended to limit the present invention.

Figure 1:
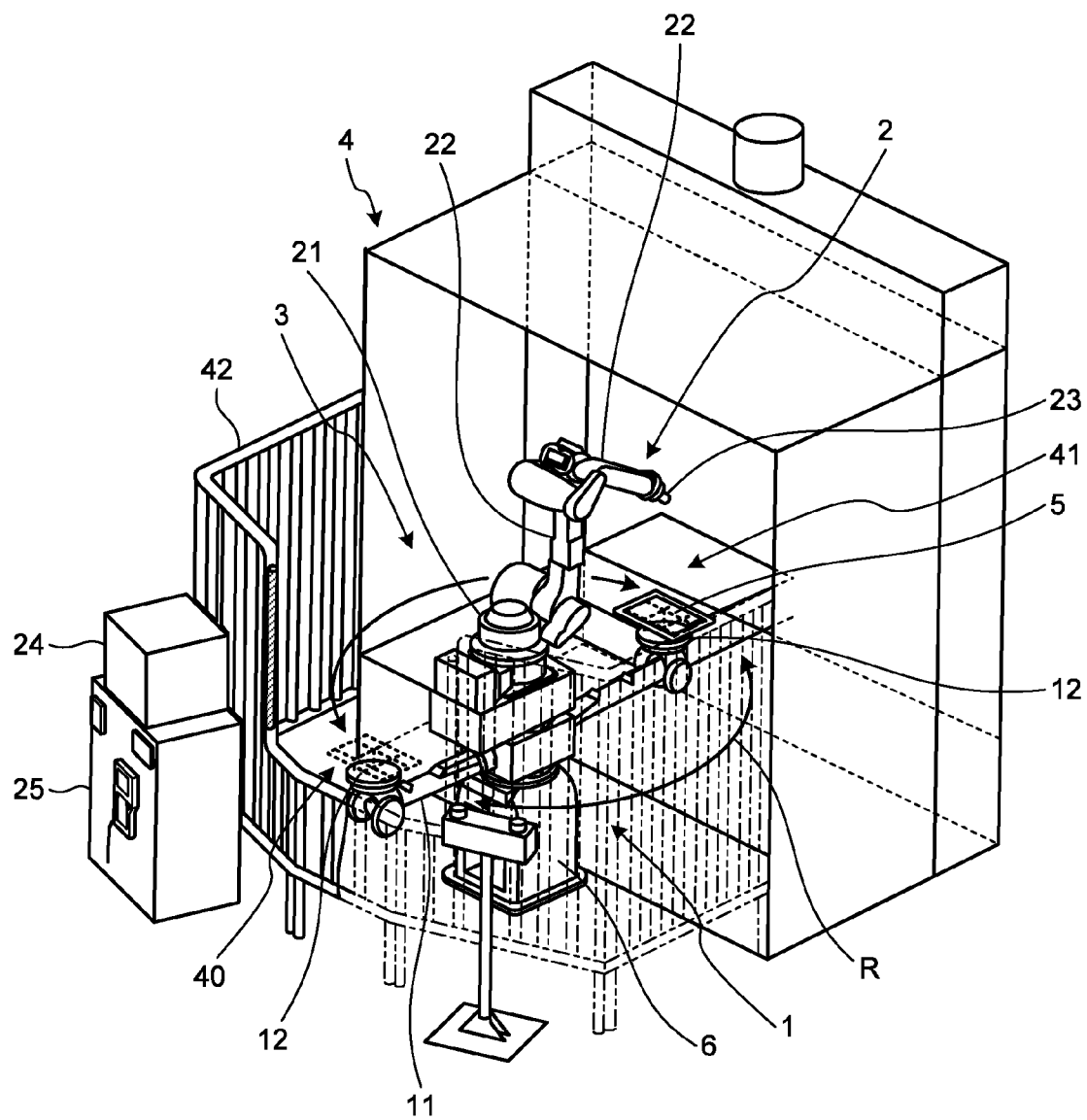
FIG. 1 is an explanation diagram illustrating a busy condition of a robot system according to an embodiment.
Figure 2:
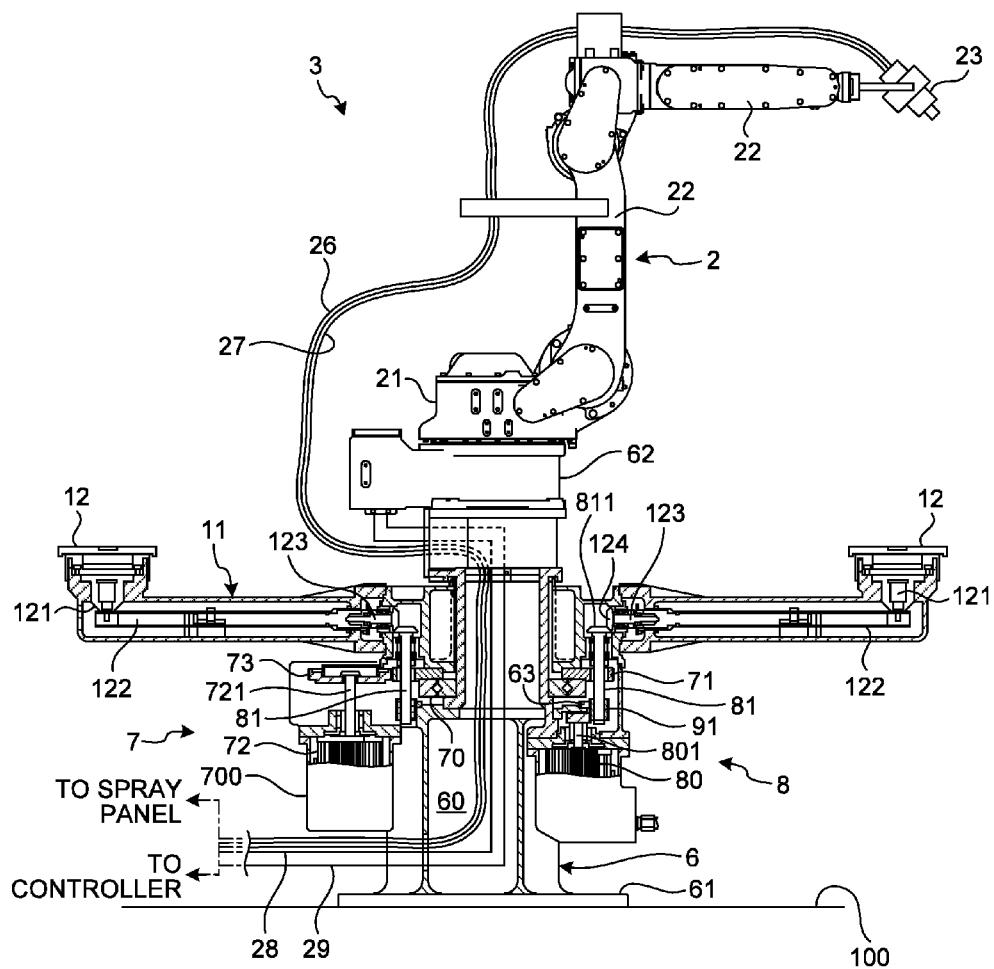
FIG. 2 is a partial cross-sectional view illustrating the robot system.

FIG. 1 is an explanation diagram illustrating a busy condition of a robot system 3 according to the embodiment. FIG. 2 is a partial cross-sectional view illustrating the robot system 3. First, a simple overview of the robot system 3 according to the present embodiment will be explained.

As illustrated in the drawings, the robot system 3 is constituted by combining a carrier device 1 that includes a swivel arm 11 and a working robot 2 that processes a workpiece 5. The robot system 3 is placed inside a working booth 4 that is walled off by a safety fence 42.

The working robot 2 is an industrial multi-joint robot and is integrally attached to the carrier device 1 at its substantially middle position via a robot mounting base 62 as illustrated in FIG. 2.

A base part 21 that is provided under the working robot 2 is attached to the robot mounting base 62, and a robot arm 22 having a plurality of joints is extended from the base part 21. Moreover, it is assumed that the working robot 2 according to the present embodiment has six joint axes. Herein, the number of axes is only an example. Therefore, the number of axes is not limited to six axes.

The robot system 3 according to the present embodiment paints the surface of the workpiece 5. Therefore, the working robot 2 is called a painting robot, and a spray nozzle 23 is attached to the leading end of the robot arm 22 as an end effector. Moreover, the working robot 2 can perform various work operations by changing the end effector.

As illustrated in FIG. 1, in the internal space of the working booth 4, a carrying in/out position 40 and a working position 41 are previously set on a circular orbit R corresponding to the swiveling trajectory of the swivel arm 11. The carrying in/out position 40 and the working position 41 are set at symmetric positions with respect to the center of the circular orbit R, namely, a central axis that acts as a rotation center O (see FIG. 6) of the swivel arm 11.

At the carrying in/out position 40, the unprocessed workpiece 5 is supplied to a turn table 12 to be described below or the paint-processed workpiece 5 is taken out from the turn table 12. On the other hand, at the working position 41, the painting process is performed by the working robot 2 on the workpiece 5. The carrier device 1 will be below explained in detail.

The robot system 3 according to the present embodiment further includes a spray panel 24 that supplies predetermined coating material and air to the spray nozzle 23 and a controller 25 that controls to drive the robot system 3. Moreover, although it is omitted in FIG. 1, a coating material hose 26 is connected between the spray nozzle 23 and the spray panel 24, and the working robot 2 and the controller 25 are connected through electric cables 27, 28, and 29, as illustrated in FIG. 2.

The spray panel 24 houses a coating material supplying device, which supplies predetermined coating material and air to the spray nozzle 23 through the coating material hose 26 that is a linear object, and an air supplying device, which supplies air to make the spray nozzle 23 spray coating material.

The controller 25 stores a working program that includes an injection time at which the spray nozzle 23 sprays coating material or air and by which the carrier device 1 and the working robot 2 are driven to perform setting operations.

The carrier device 1 includes a base 6 that is disposed on an installation surface 100 and the swivel arm 11 that is provided on the base 6 to swivel freely.

The base 6 has a hollow structure and includes a hollow part 60 that has at least therein the rotation center O (see FIG. 6) of the swivel arm 11. Herein, predetermined linear objects, namely, the first electric cable 27, the second electric cable 28, and the third electric cable 29 for the robot, and further the coating material hose 26, and the like can be inserted into through the hollow part 60.

The turn tables 12 and 12 are attached to both ends of the swivel arm 11. The turn tables 12 and 12 can be located at either the carrying in/out position 40 or the working position 41, which is previously set on the circular orbit R, in accordance with swiveling of the swivel arm 11.

In other words, the turn tables 12 and 12, which are attached to both the leading ends of the swivel arm 11 formed substantially linearly, can revolve along the circular orbit R to reach the carrying in/out position 40 and the working position 41 that are previously set on the circular orbit R. In this way, each of the turn tables 12 and 12 places thereon the workpiece 5 and carries it between the carrying in/out position 40 and the working position 41.

Each of the turn tables 12 and 12 is constituted to be able to rotate around its axis in a horizontal direction in the state where the workpiece 5 is placed thereon at the position at which each the turn table is attached to the swivel arm 11. In the present embodiment, the carrier device 1 is controlled to stop swiveling the swivel arm 11 when both the leading ends of the swivel arm 11 are located at the carrying in/out position 40 and the working position 41. The turn table 12 located at the working position 41 is rotated on its axis and the turn table 12 located at the carrying in/out position 40 is not rotated.

The swivel time of the swivel arm 11, the prohibition of rotation when the turn table 12 is located at the carrying in/out position 40, and the rotational mode when the turn table 12 is located at the working position 41 can be controlled by the working program that is stored in the controller 25.

In this way, the workpiece 5 can be placed on one of the turn tables 12 and 12 at the carrying in/out position 40, and then the workpiece 5 can be carried to the working position 41 by swiveling the swivel arm 11 by 180 degrees to perform the painting operation at the working position 41. Then, the whole of the workpiece 5 having a three-dimensional surface can be evenly painted by horizontally rotating the turn table 12 at the position during the painting operation.

On the other hand, when the operation is performed at the working position 41, the turn table 12 located at the carrying in/out position 40 is stopped and the unprocessed workpiece 5 to be painted next is placed thereon. When the painting operation is terminated at the working position 41, the workpiece 5 is carried to the carrying in/out position 40 by further swiveling the swivel arm 11 by 180 degrees to take out the processed workpiece 5 on which painting is completed. At this time, the turn table 12 on which the unprocessed workpiece 5 previously placed at the carrying in/out position 40 is placed is located at the working position 41. Moreover, the swiveling direction of the swivel arm 11 between the carrying in/out position 40 and the working position 41 may be reversed at both positions to perform a reciprocating movement or may be always the same to pass at both positions.

In this way, the robot system 3 according to the present embodiment can efficiently perform the painting operation in accordance with the working program. Moreover, even if the painting surface of the workpiece 5 is a three-dimensional shape with concavity and convexity, a painting process can be performed on the workpiece to have a uniform painting film thickness.

Herein, the workpiece 5 includes, for example, a chassis of a mobile phone, a chassis of a personal computer, and an instrument panel of an automobile. In this regard, however, if a workpiece should be painted and can be placed on the turn tables 12 and 12 of the carrier device 1, the workpiece 5 may be any workpiece. Moreover, the number of workpieces placed on the turn table 12 at a time may be one or more.

The characteristic configuration of the carrier device 1 and the robot system 3 according to the present embodiment is the rotational mode of the turn tables 12 and 12 while the turn table 12 is passing or reciprocating between the carrying in/out position 40 and the working position 41 by rotating the swivel arm 11 of the carrier device 1 by 180 degrees.

In other words, the turn tables 12 and 12 are configured to be rotated by an integral multiple of 360 degrees with respect to the installation surface 100, while the turn table 12 is passing or reciprocating between the carrying in/out position 40 and the working position 41 by rotating the swivel arm 11 by 180 degrees.

Figure 3:
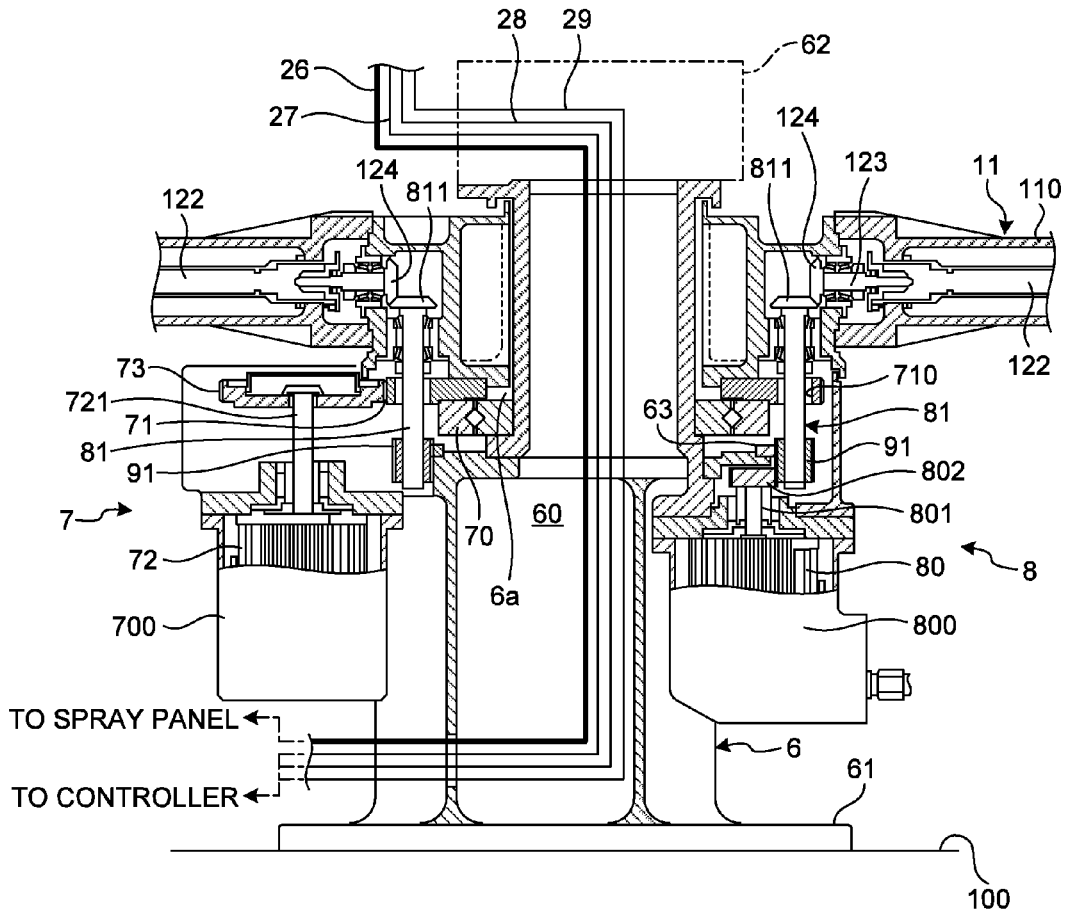
FIG. 3 is a cross-sectional view illustrating a drive mechanism of a carrier device according to the embodiment.
Figure 4:
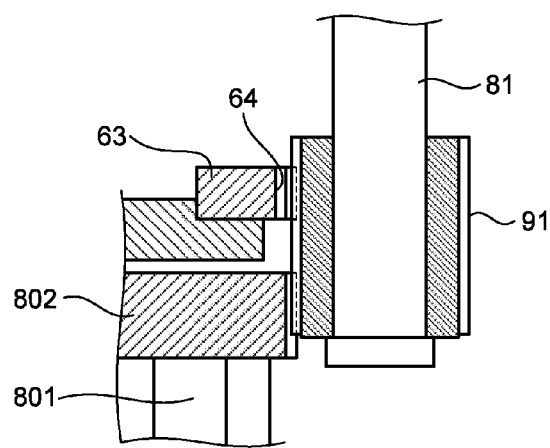
FIG. 4 is an explanation diagram obtained by expanding a part of the drive mechanism.
Figure 5A:
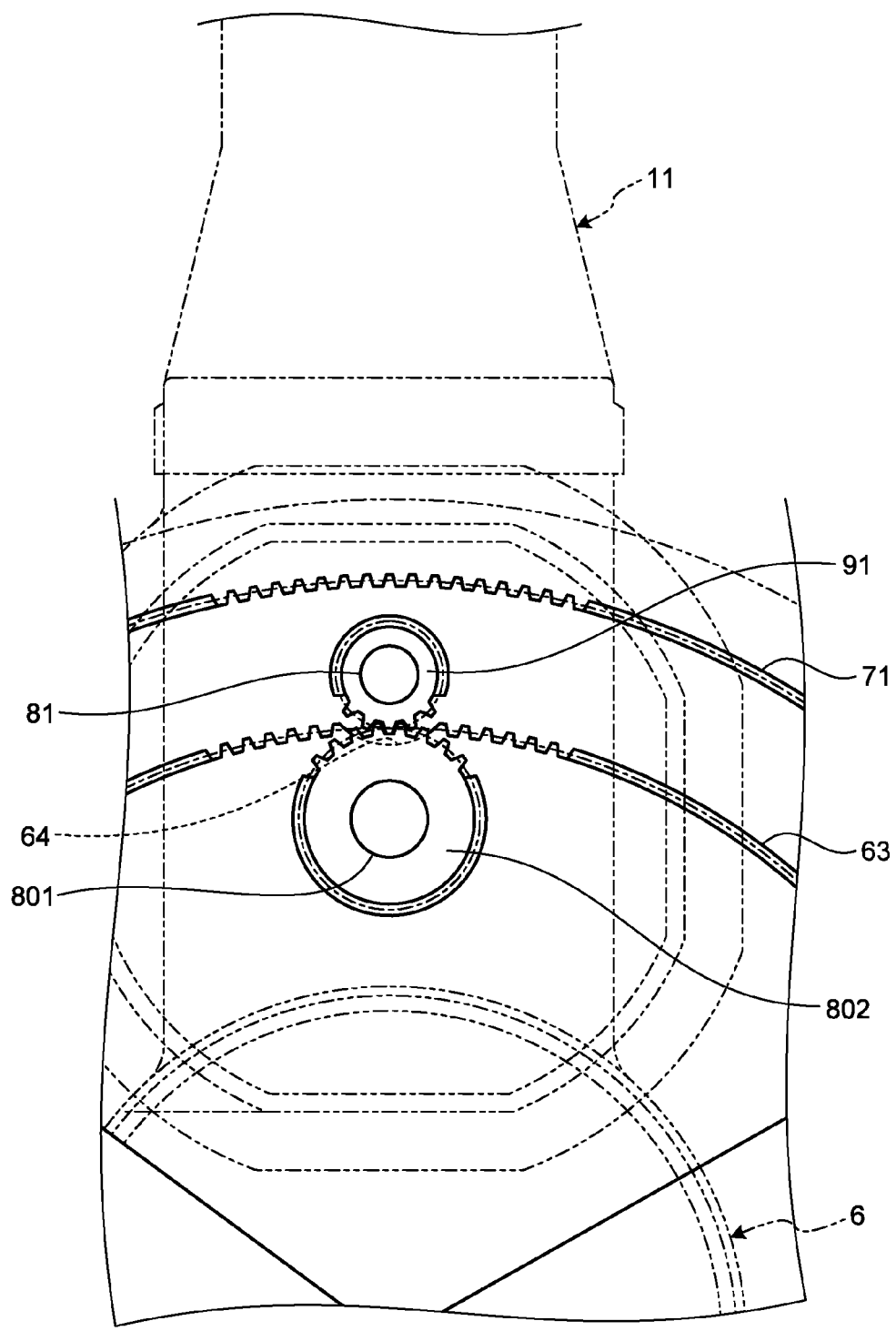
FIG. 5A is a plan view illustrating a state in which one end of a swivel arm is located at a working position.
Figure 5B:
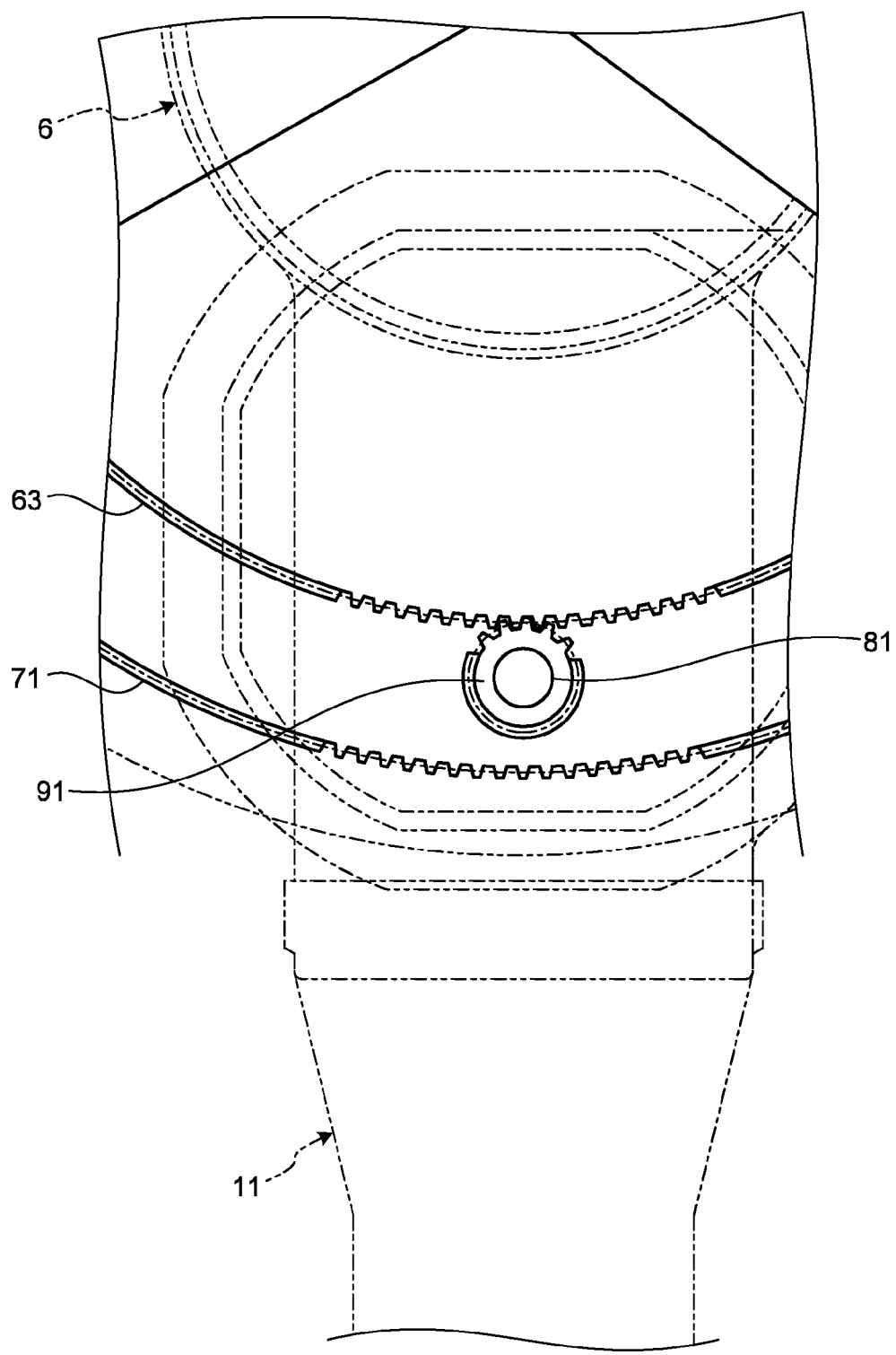
FIG. 5B is a plan view illustrating a state in which the one end of the swivel arm is located at a position other than the working position.

Hereinafter, the rotational mode of the turn table 12 will be explained in detail together with the specific configuration of the carrier device 1. First, the carrier device 1 included in the robot system 3 according to the present embodiment will be explained with reference to FIGS. 2 to 5B. FIG. 3 is a cross-sectional view illustrating the drive mechanism of the carrier device 1 according to the embodiment. FIG. 4 is an explanation diagram obtained by expanding a part of the drive mechanism. FIG. 5A is a plan view illustrating a state in which one end of the swivel arm 11 is located at the working position 41. FIG. 5B is a plan view illustrating a state in which the one end of the swivel arm 11 is located at a position other than the working position 41.

As illustrated in FIGS. 2 and 3, the carrier device 1 is configured to include the swivel arm 11 that is rotatably provided on the tubular base 6. Herein, the tubular base 6 includes an installation base 61 that is provided at its lower end to be fixed to the installation surface 100 and the robot mounting base 62 that is provided at its upper end. The swivel arm 11 linearly extends with a central focus on the base 6. A pair of the turn tables 12 and 12 is attached to both ends of the swivel arm.

As illustrated in FIG. 3, an arm swiveling mechanism 7 that swivels the swivel arm 11 includes an arm swivel ring gear 71 and a swivel motor 72. The arm swivel ring gear 71 is concatenated to an arm support circumference surface 6a of the base 6 and is also concatenated to the bottom of the swivel arm 11. The swivel motor 72 is provided with an output shaft 721 whose leading end is attached to a drive gear 73 engaged with the arm swivel ring gear 71. Moreover, a speed reducer (not illustrated) is connected to the output shaft 721 of the swivel motor 72.

The swivel motor 72 is attached to the outside of the base 6. More specifically, when the carrier device 1 is placed inside the working booth 4, the swivel motor 72 is attached at a side close to the carrying in/out position 40 outside the base 6 in the state where the swivel motor is housed in a motor case 700.

The arm swivel ring gear 71 is fixed to the lower portion the swivel arm 11, and turns along the circumferential surface of the base 6 via a cross roller 70, which is a bearing concatenated to the arm support circumference surface 6a of the base 6, to swivel the swivel arm 11.

In other words, the power for rotating the swivel arm 11 is supplied like "the swivel motor 72->the output shaft 721->the drive gear 73->the arm swivel ring gear 71->the swivel arm 11" in the arm swiveling mechanism 7. In this way, the swivel arm 11 can be swiveled in such a manner that the turn tables 12 and 12 revolve around the base 6.

The swivel motor 72 is controlled by the working program so that its output is stopped whenever the arm swivel ring gear 71 is rotated 180 degrees. In other words, the swivel arm 11 can rotate or reciprocate the turn tables 12 and 12, which are provided on both the leading ends thereof to swivel along the circular orbit R, between the carrying in/out position 40 and the working position 41 between which the base 6 is located while stopping them for a predetermined time at the positions.

By employing this configuration, when the swivel motor 72 is driven, the arm swivel ring gear 71 is rotated and thus the swivel arm 11 is swiveled while its leading end draws a swiveling trajectory. In other words, the turn tables 12 and 12 that are respectively attached to both the ends of the swivel arm 11 move along the circular orbit R between the carrying in/out position 40 and the working position 41. In this way, the workpiece 5 placed on the turn table 12 can be carried from the carrying in/out position 40 to the working position 41, or from the working position 41 to the carrying in/out position 40.

When one of the turn tables 12 and 12 that are provided on both the ends of the swivel arm 11 to be rotatable in a horizontal direction is located at the working position 41, the carrier device 1 includes a table rolling mechanism 8 that makes the turn table 12 rotate around its axis at the position at which the turn table 12 is attached to the swivel arm 11.

The table rolling mechanism 8 includes a first in-case rotation shaft 121 and a second in-case rotation shaft 122 that are housed in an arm case 110 of the swivel arm 11 and a primary table rotating shaft 81 that is coupled to them in an interlocking manner.

In other words, as illustrated in FIGS. 2 and 3, the first in-case rotation shaft 121 is directly connected to the turn table 12 and extends perpendicularly. On the other hand, the second in-case rotation shaft 122 horizontally extends inside the arm case 110, in which its leading end is coupled to the first in-case rotation shaft 121 in an interlocking manner and its bottom end is connected to a transmission shaft 123 that is provided with a secondary bevel gear 124.

As illustrated in FIGS. 2 and 3, the table rolling mechanism 8 further includes a table rotation motor 80 that acts as a power source that can be coupled to the primary table rotating shaft 81 in an interlocking manner. When the carrier device 1 is placed inside the working booth 4, the table rotation motor 80 is attached at a side close to the working position 41 outside the base 6 in the state where the table rotation motor is housed in a case 800.

The primary table rotating shaft 81 constitutes a part of a table rotating mechanism to be described below. As illustrated in FIG. 3, the primary table rotating shaft 81 is inserted into a through-hole 710 provided in the arm swivel ring gear 71 to turn (revolve) around the base 6 along with the swivel arm 11.

Moreover, the leading end of the primary table rotating shaft 81 is provided with a primary bevel gear 811 that is engaged with the secondary bevel gear 124, as illustrated in FIG. 3. On the other hand, the bottom end of the primary table rotating shaft 81 is provided with a transmission gear 91 that can be engaged with a guiding ring gear 63 fixed on the outer circumferential surface of the base 6 and is coupled to a rotating shaft 801 of the table rotation motor 80 in an interlocking manner, as illustrated in FIGS. 3 and 4.

In this case, two pairs of the first in-case rotation shaft 121, the second in-case rotation shaft 122, the transmission shaft 123, and the primary table rotating shaft 81 are provided in the table rolling mechanism 8 described above in such a manner that the respective components of two pairs are located at symmetrical positions while placing the base 6 therebetween.

In the table rotation motor 80 that is singly provided at the side close to the working position 41 of the base 6, the rotating shaft 801 extends upward. Therefore, when the primary table rotating shaft 81 is located at the working position 41, the lower portion of the tubular transmission gear 91 provided at the bottom end of the primary table rotating shaft 81 and an output gear 802 provided at the leading end of the rotating shaft 801 of the table rotation motor 80 are engaged with each other at this time.

When the swiveling operation of the swivel arm 11 is stopped and one of the turn tables 12 and 12 is located at the working position 41, the other of the turn tables 12 and 12 is located at the carrying in/out position 40. At this time, the turn table 12 that is located at the carrying in/out position 40 does not rotate (rotate on its axis) at the position because the transmission gear 91 of the primary table rotating shaft 81 coupled to the turn table 12 is mechanically engaged with the guiding ring gear 63 fixed on the outer circumferential surface of the base 6.

As described above, the carrier device 1 according to the present embodiment can rotate the turn table 12 at a desired rotational speed and rotation number by using the table rotation motor 80 when the turn table 12 is located at the working position 41. Furthermore, the table rotation motor 80 that is the power source of the rotation can be realized by one motor. Therefore, cost reduction can be achieved.

Meanwhile, as illustrated in FIG. 4, because the upper portion of the transmission gear 91 is engaged with the guiding ring gear 63, the transmission gear 91 is turned (revolved) along with the swivel arm 11 while being engaged with the guiding ring gear 63 when the arm swivel ring gear 71 is rotated to turn the swivel arm 11.

In other words, the primary table rotating shaft 81 is turned (revolved) along with the swivel arm 11. At this time, the primary table rotating shaft 81 is rotated on its axis via the transmission gear 91 engaged with the arm swivel ring gear 71 (details are below described). On the other hand, the primary table rotating shaft 81 is coupled to the turn table 12 via the second in-case rotation shaft 122 and the first in-case rotation shaft 121 in an interlocking manner as described above. Therefore, a rotational operation in the revolution of the primary table rotating shaft 81 leads to rotate the turn table 12 on its axis via the second in-case rotation shaft 122 and the first in-case rotation shaft 121.

As described above, the carrier device 1 according to the present embodiment includes a table rotating mechanism that makes the turn table 12 rotate on its axis while the turn table 12 is passing or reciprocating between the carrying in/out position 40 and the working position 41. The table rotating mechanism shares the primary table rotating shaft 81 that constitutes a part of the table rolling mechanism 8.

The primary table rotating shaft 81 has the configuration that its leading end is coupled to the turn table 12 via the second in-case rotation shaft 122 and the first in-case rotation shaft 121 in an interlocking manner and its bottom end is fixed to the transmission gear 91 and is engaged with the guiding ring gear 63 fixed on the outer circumferential surface of the base 6 in order to be rotated.

At this time, the angular velocity of revolution and the angular velocity of rotation of the turn table 12 are uniformed. In other words, a ratio between the angular velocity of swivel of the swivel arm 11 and the angular velocity of rotation of the turn table 12, while the turn table 12 is passing or reciprocating between the carrying in/out position 40 and the working position 41, is set to 1:1. An operation of the turn table 12 in this case will be below explained in detail with reference to FIG. 6 and FIGS. 7A to 7C.

In this way, the carrier device 1 according to the present embodiment rotates the turn table 12 by 180 degrees with respect to the swivel arm 11 in the same direction as the swiveling direction of the swivel arm 11 while the turn table 12 is passing or reciprocating between the carrying in/out position 40 and the working position 41 by swiveling the swivel arm 11 by 180 degrees.

As described above, the table rolling mechanism 8 turns (revolves) components excluding the table rotation motor 80 around the base 6 along with the swivel arm 11 and rotates the turn table 12 on its axis while revolving. Then, when one of the turn tables 12 and 12 on the swivel arm 11 is located at the working position 41, the turn table 12 is coupled to the table rotation motor 80 in an interlocking manner at this time, and thus can be rotated at the rotation number and the rotational speed suitable for the painting operation.

In other words, the power of the table rolling mechanism 8 for rotating the turn table 12 at a desired rotation number and rotational speed is transmitted as described below on condition that one of the turn tables 12 and 12 on the swivel arm 11 is located at the working position 41.

In other words, the power for rotating the turn table 12 is supplied like "the table rotation motor 80->the rotating shaft 801->the output gear 802->the transmission gear 91->the primary table rotating shaft 81->the primary bevel gear 811->the secondary bevel gear 124->the transmission shaft 123->the second in-case rotation shaft 122->the first in-case rotation shaft 121->the turn table 12".

In the present embodiment, to realize the transmission of power described above, a circular arc-shaped cutout portion 64 is formed at the position that faces the working position 41 on the peripheral border of the guiding ring gear 63 fixed to the base 6, as illustrated in FIGS. 4 and 5A.

In other words, if one of the turn tables 12 and 12 is located at the working position 41 and the swivel of the swivel arm 11 is stopped, the transmission gear 91 of the primary table rotating shaft 81 that revolves and rotates around the base 6 along with the swivel arm 11 is engaged with the output gear 802 of the table rotation motor 80. On the other hand, although the transmission gear 91 is engaged with the guiding ring gear 63 to revolve around the base till now, the transmission gear 91 comes free from engaging with the guiding ring gear 63 after the transmission gear 91 is located at the cutout portion 64.

Therefore, when the swivel motor 72 of the arm swiveling mechanism 7 is stopped by the working program at the time at which one of the turn tables 12 and 12 of the swivel arm 11 is located at the working position 41, the swivel arm 11 stops swiveling around the base 6. In this state, if the table rotation motor 80 is driven by the working program, the power from the table rotation motor 80 is transmitted to the turn table 12 via the transmission gear 91 as indicated by the power transmission path described above, and thus the turn table 12 can be rotated on its axis. While the turn table 12 is being rotated, the working robot 2 performs the painting operation on the workpiece that is placed on the turn table 12 to be rotated.

After the painting operation is terminated by the passage of a predetermined time, the table rotation motor 80 is stopped by the working program. On the other hand, the swivel motor 72 of the arm swiveling mechanism 7 is driven by the working program to again start swiveling the swivel arm 11. By doing so, the transmission gear 91 of the primary table rotating shaft 81 comes free from engaging with the output gear 802 of the table rotation motor 80. Then, the transmission gear 91 moves from the cutout portion 64 to be again engaged with the guiding ring gear 63, and thus starts revolving and rotating around the base 6 in conjunction with the swivel of the swivel arm 11. FIG. 5B illustrates a state in which the primary table rotating shaft 81 is located at a position other than the working position 41. In this case, the transmission gear 91 is engaged with the guiding ring gear 63 to turn (revolve) along with the swivel arm 11 while rotating.

As described above, the robot system 3 and the working robot 2 according to the present embodiment have the table rotating mechanism that is constituted by a part of the table rolling mechanism 8 and a part of the arm swiveling mechanism 7. Moreover, by the action of the table rotating mechanism, the turn table 12 revolves along the circular orbit R and rotates on its axis in a horizontal direction in the state where it places thereon the workpiece 5. In other words, while the turn table 12 is passing or reciprocating between the carrying in/out position 40 and the working position 41 by rotating the swivel arm 11 by 180 degrees, the turn tables 12 and 12 can be rotated by an integral multiple of 360 degrees with respect to the installation surface 100.

Figure 6:
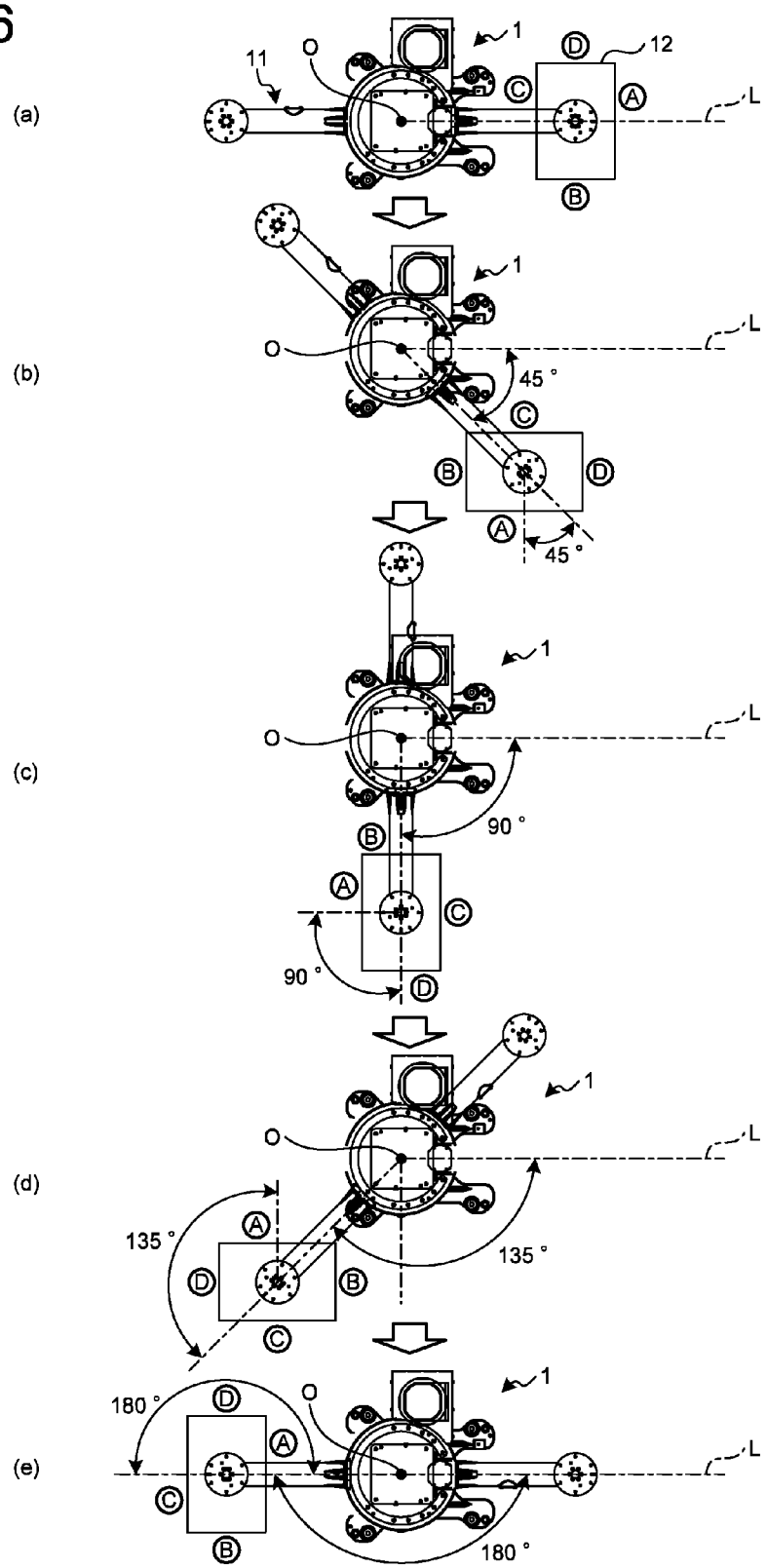
FIG. 6 is an explanation diagram illustrating the rotation of a turn table according to the embodiment.
Figure 7A:
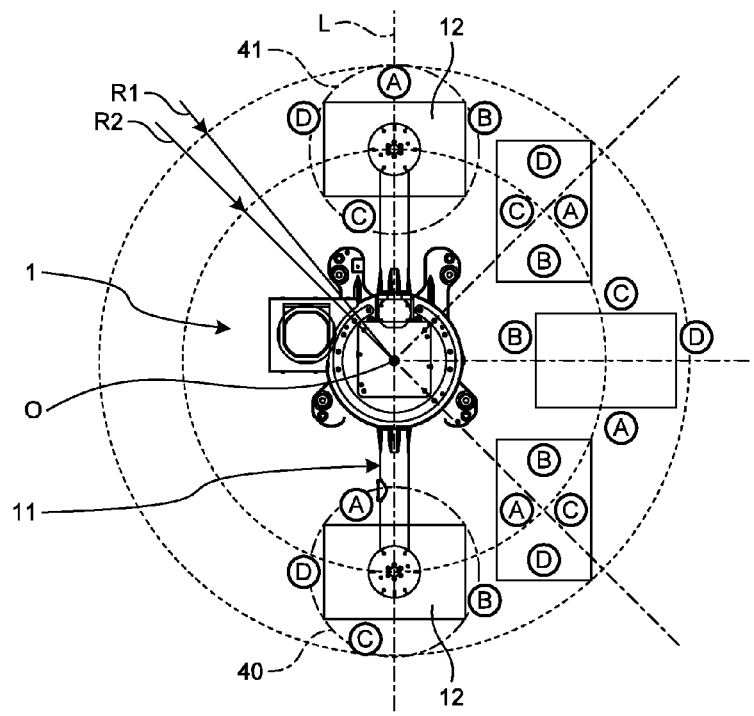
FIG. 7A is an explanation diagram illustrating revolution and rotation between the working position and the carrying in/out position of the turn table.
Figure 7B:
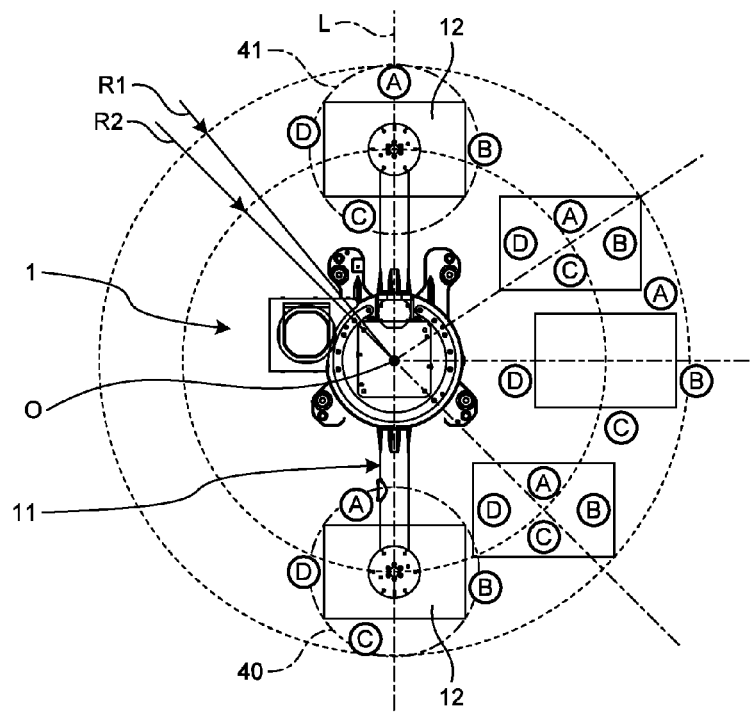
FIG. 7B is an explanation diagram illustrating revolution and rotation between the working position and the carrying in/out position of the turn table according to a first comparative example.
Figure 7C:
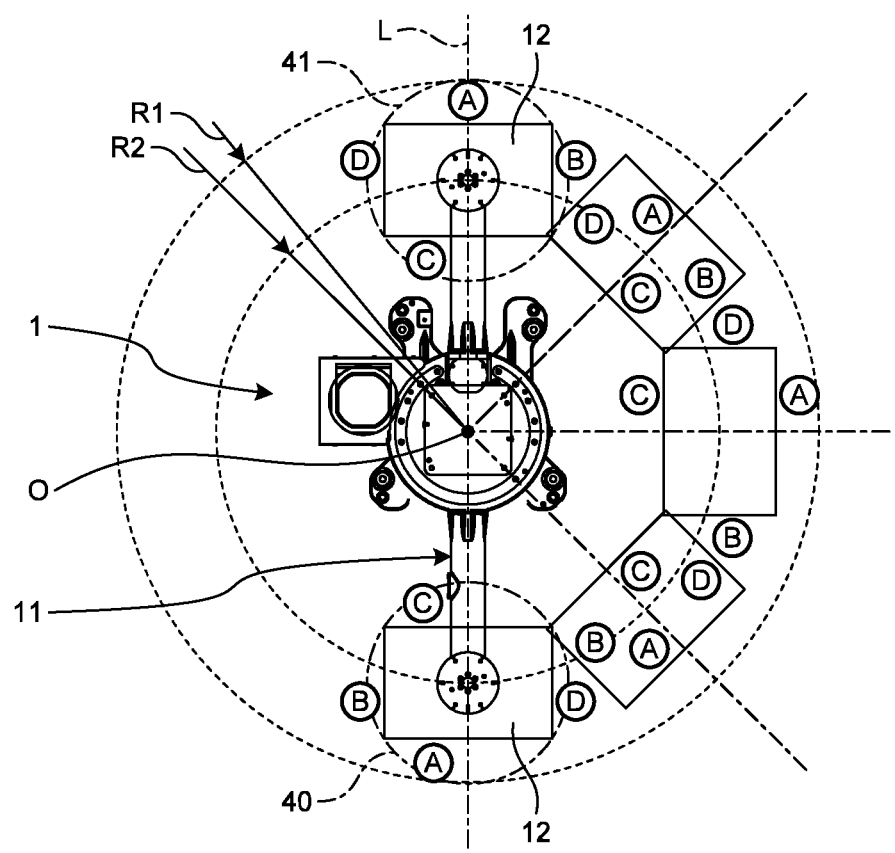
FIG. 7C is an explanation diagram illustrating revolution and rotation between the working position and the carrying in/out position of the turn table according to a second comparative example.

Now, an operation of the turn table 12 will be explained with reference to FIG. 6 and FIGS. 7A to 7C. These drawings are plan views of the carrier device 1 when it is viewed from above. FIG. 6 is an explanation diagram illustrating the rotation of the turn table 12 according to the present embodiment. FIG. 7A is an explanation diagram illustrating revolution and rotation between the working position 41 and the carrying in/out position 40 of the turn table 12. FIG. 7B is an explanation diagram illustrating revolution and rotation between the working position 41 and the carrying in/out position 40 of the turn table 12 according to a first comparative example. FIG. 7C is an explanation diagram illustrating revolution and rotation between the working position 41 and the carrying in/out position 40 of the turn table 12 according to a second comparative example. Herein, the same components of FIGS. 7B and 7C as those of the carrier device 1 according to the present embodiment have the same reference numbers, and detailed descriptions are omitted. For the purposes of explanation, the turn table 12 in these diagrams is illustrated larger than that of FIGS. 1 and 2.

In FIG. 6, one of the turn tables 12 and 12 provided on the swivel arm 11 of the carrier device 1 is a rectangular table that has A, B, C, and D sides, and the carrying in/out position 40 and the working position 41 are respectively located at the left side and the right side of the page space. It is assumed that an axis line L passing on the rotation center O of the swivel arm 11 is located to link the carrying in/out position 40 and the working position 41, and an initial state (a) is a state where one of the turn tables 12 and 12 is located at the working position 41.

In the initial state (a), the turn table 12 has a side A at the right side, a side C at the left side, a side B at the lower side, and a side D at the upper side of the page space that is opposite to the side B. Herein, it is assumed that the swivel arm 11 is swiveled clockwise.

In a state (b) where the swivel arm 11 is swiveled 45 degrees from the initial state (a), the side A of the turn table 12 faces the lower side of the page space. In other words, it turns out that the turn table 12 is rotated 90 degrees with respect to the installation surface 100 of the carrier device 1 compared to the initial state (a). This result is obtained by rotating the turn table 12 by 45 degrees with respect to the swivel arm 11 in the same direction as the swiveling direction of the swivel arm 11. In this state, the turn table 12 is rotated 90 degrees (45 degrees+45 degrees) with respect to the installation surface 100 compared to the initial state (a).

Similarly, in a state (c) where the swivel arm 11 is swiveled 90 degrees from the initial state (a), the side A of the turn table 12 faces the left side of the page space. In other words, it turns out that the turn table 12 is rotated 180 degrees with respect to the installation surface 100 of the carrier device 1 compared to the initial state (a). This result is obtained by rotating the turn table 12 by 90 degrees with respect to the swivel arm 11 in the same direction as the swiveling direction of the swivel arm 11. In this state, the turn table 12 is rotated 180 degrees (90 degrees+90 degrees) with respect to the installation surface 100 compared to the initial state (a).

Then, in a state (d) where the swivel arm 11 is swiveled 135 degrees from the initial state (a), the side A of the turn table 12 faces the upper side of the page space. In other words, it turns out that the turn table 12 is rotated 270 degrees with respect to the installation surface 100 of the carrier device 1 compared to the initial state (a). This result is obtained by rotating the turn table 12 by 135 degrees with respect to the swivel arm 11 in the same direction as the swiveling direction of the swivel arm 11. In this state, the turn table 12 is rotated 270 degrees (135 degrees+135 degrees) with respect to the installation surface 100 compared to the initial state (a).

Then, in a state (e) where the swivel arm 11 is swiveled 180 degrees from the initial state (a) and one of the turn tables 12 and 12 is located at the working position 41, the side A of the turn table 12 faces the right side of the page space similarly to the initial state (a). In other words, it turns out that the turn table 12 is rotated 360 degrees with respect to the installation surface 100 of the carrier device 1 compared to the initial state (a). This result is obtained by rotating the turn table 12 by 180 degrees with respect to the swivel arm 11 in the same direction as the swiveling direction of the swivel arm 11. In this state, the turn table 12 is rotated 360 degrees (180 degrees+180 degrees) with respect to the installation surface 100 compared to the initial state (a).

Next, while comparing FIGS. 7A, 7B, and 7C, it will be explained that the carrier device 1 and the robot system 3 according to the present embodiment can prevent the workpiece 5 held on the turn table 12 from being exposed to biased wind during carrying. FIG. 7A illustrates the states (a) to (e) of FIG. 6 on the same circular orbit R.

In FIGS. 7A to 7C, it is assumed that the working position 41 is provided at the upper side and the carrying in/out position 40 is provided at the lower side of the page space. Moreover, a symbol R1 in each drawing indicates an outermost circular orbit when the swivel arm 11 that is provided with the rectangular turn table 12 is swiveled. A symbol R2 indicates a circular orbit that is drawn by the center of the turn table 12.

As illustrated in FIG. 7A, while the turn table 12 is being revolved 180 degrees from the working position 41 to the carrying in/out position 40, the turn table 12 is rotated 360 degrees on its axis with respect to the installation surface 100. Therefore, the turn table 12 is once rotated on its axis with respect to the installation surface 100 when it is revolved along the circular orbit R in the range of 180 degrees.

Therefore, when the swivel arm 11 is swiveled, namely, when the turn table 12 is revolved, the winded surface of the workpiece 5 held on the turn table 12 is gradually changed. In other words, the workpiece 5 can be prevented from being exposed to biased wind while the workpiece 5 is being carried from the working position 41 to the carrying in/out position 40. Particularly, because the robot system 3 according to the present embodiment performs the painting operation on the workpiece 5, a degree of drying of the workpiece 5 after painting is substantially equalized over the surface and thus a painting quality can be equally achieved over the surface.

The posture of the turn table 12 relative to the installation surface 100 is the same at the carrying in/out position 40 and the working position 41. In other words, the posture of the workpiece 5 placed on the turn table 12 is not changed at the carrying in/out position 40 and the working position 41. Therefore, if the workpiece 5 is placed on the turn table 12 in a posture most suitable for painting or in a posture most suitable for handling, working efficiency increases because painting and carrying in/out can be performed in that posture.

On the other hand, in the first comparative example illustrated in FIG. 7B, the turn table 12 does not change a posture relative to the installation surface 100 while it is revolved 180 degrees from the working position 41 to the carrying in/out position 40. In other words, the turn table 12 is revolved in the state where it is not apparently rotated on its axis with respect to the installation surface 100. This result is obtained by rotating the turn table 12 by 180 degrees with respect to the swivel arm 11 in a direction opposite to the swiveling direction of the swivel arm 11 when the turn table 12 is revolved along the circular orbit R in the range of 180 degrees. In this state, the turn table 12 is consequently rotated 0 degrees (180 degrees−180 degrees) with respect to the installation surface 100.

As described above, it is preferable that the posture of the workpiece 5 is not changed at the carrying in/out position 40 and the working position 41. However, as the result, the winded surface of the workpiece 5 placed on the turn table 12 is not hardly changed. In other words, while the workpiece 5 is being carried from the working position 41 to the carrying in/out position 40, the workpiece 5 is consequently exposed to biased wind. In other words, because the surface of the workpiece 5 after painting has an uneven drying degree or coating materials have uneven flow, it is difficult to equally achieve a painting quality over the surface. Moreover, there is a possibility that dust or the like adheres to the biased surface.

In the second comparative example illustrated in FIG. 7C, the turn table 12 is fixed to the swivel arm 11. Therefore, the turn table 12 is rotated 180 degrees with respect to the installation surface 100, similarly to the swivel arm 11, while it is revolved 180 degrees from the working position 41 to the carrying in/out position 40. In other words, the turn table 12 is revolved without rotating on its axis with respect to the installation surface 100.

Therefore, while the turn table 12 is being rotated 180 degrees from the working position 41 to the carrying in/out position 40, only the substantially definite surface of the workpiece 5 is exposed to wind and the other surface is exposed to a whirlpool or the like. In other words, because the surface of the workpiece 5 after painting has different drying degrees and coating materials have uneven flow, it is difficult to equally achieve a painting quality over the surface. Moreover, there is a possibility that dust or the like adheres to a definite surface. In addition, because the posture of the workpiece 5 has opposite directions at the working position 41 and the carrying in/out position 40, this is slightly disadvantageous from the viewpoint of working efficiency.

FIRST ALTERNATIVE EXAMPLE

It has been explained that the swivel arm 11 of the carrier device 1 has a substantially linear shape whose both ends are provided with the turn tables 12 and 12. However, according to the first alternative example, as illustrated in FIG. 8, the swivel arm 11 has a configuration that two arms 11A and 11B are extended in the shape of a substantial V at intervals of 120 degrees from the central axis that acts as the rotation center O.

Figure 8:
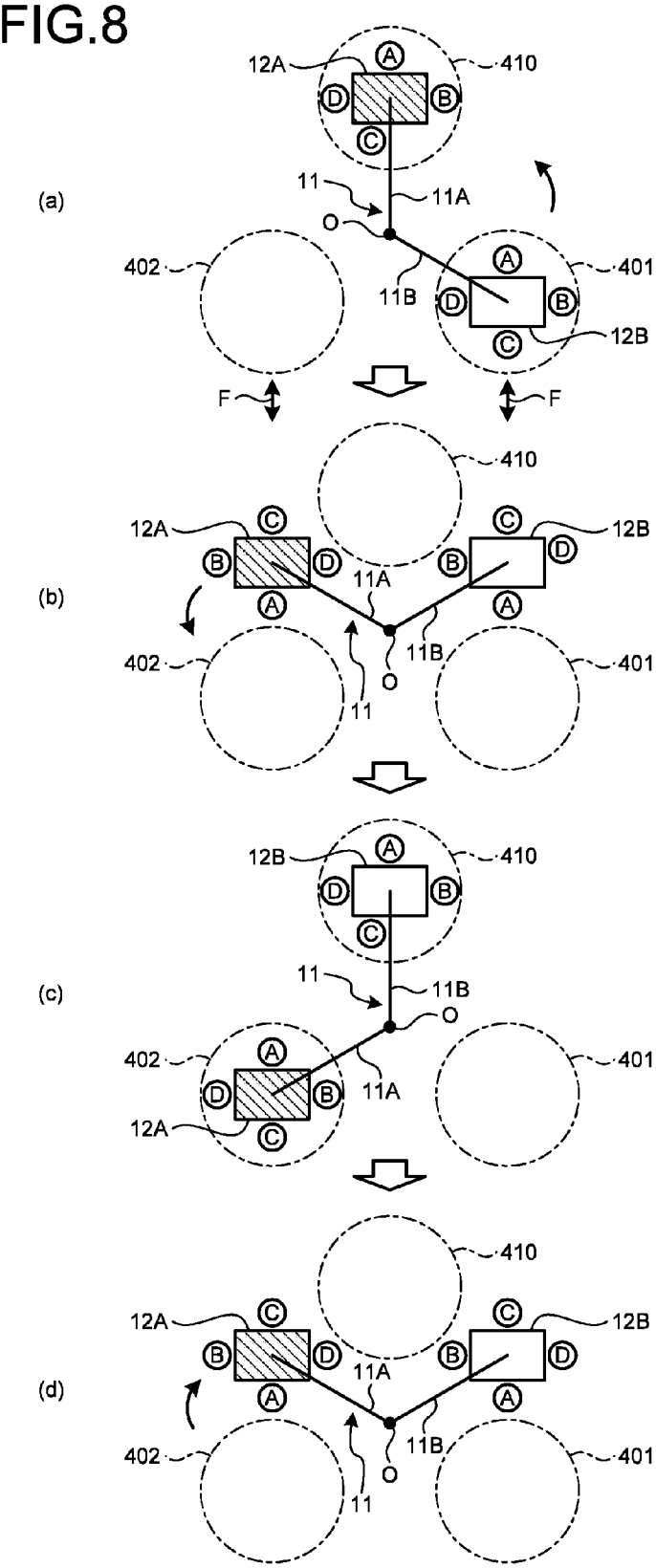
FIG. 8 is an explanation diagram illustrating revolution and rotation between the working position and the carrying in/out position of the turn table according to a first alternative example.

FIG. 8 is an explanation diagram schematically illustrating revolution and rotation between a working position and carrying in/out positions of turn tables according to the first alternative example. As illustrated in FIG. 8, turn tables 12A and 12B are respectively attached to the two arms 11A and 11B. Both the turn tables 12A and 12B are configured to be rotatable on their axes at their attachment positions in a horizontal direction.

In this example, two carrying in/out positions 401 and 402 and a working position 410 are previously set on the circular orbit R of the swivel arm 11 at intervals of 120 degrees. Arrows F indicate carrying in and carrying out of the workpiece 5 (see FIG. 1) at the carrying in/out positions 401 and 402.

Hereinafter, an operation of the carrier device 1 in this case will be explained. As illustrated in FIG. 8, in the first state (a), the turn table 12A is located at the working position 410 and the painting operation is performed on the workpiece 5. In the meantime, the turn table 12B is supplied with the unpainted workpiece 5 at the carrying in/out position 401 that is located at the right side of the diagram. Moreover, in the first state (a), the side A of the turn table 12A faces the upper side of the page space.

When the painting operation is finished, the swivel arm 11 is swiveled counterclockwise, and the already-painted workpiece 5 on the turn table 12A is carried to the carrying in/out position 402 that is located at the left side of the diagram. At this time, the turn table 12B that is supplied with the unpainted workpiece 5 goes toward the working position 410. As described above, the state where the swivel arm 11 is being swiveled counterclockwise after painting is the second state (b). In the second state (b) of FIG. 8, the swivel arm 11 is swiveled 60 degrees.

In the second state (b), when the swivel arm 11 is swiveled (revolved) 60 degrees from the first state (a), for example, the side A of the turn table 12A faces the lower side of the page space. In other words, it turns out that the turn table 12A is rotated 180 degrees with respect to the installation surface 100 of the carrier device 1 compared to the first state (a). This result is obtained by rotating the turn table 12A by 120 degrees with respect to the swivel arm 11 in the same direction as the swiveling direction of the swivel arm 11. The turn table 12A is rotated 180 degrees (60 degrees+120 degrees) with respect to the installation surface 100 compared to the first state (a). In the meantime, the turn table 12B is also rotated 120 degrees with respect to the swivel arm 11 in the same direction as the swiveling direction of the swivel arm 11, and thus is rotated 180 degrees (60 degrees+120 degrees) with respect to the installation surface 100 compared to the first state (a).

It is assumed that the state where the turn table 12A arrives at the carrying in/out position 402 is the third state (c). In the third state (c), the painted workpiece 5 is taken out at the carrying in/out position 402 and the workpiece 5 on the turn table 12B is painted at the working position 410.

In the third state (c), the side A of the turn table 12A faces the upper side of the page space. In other words, it turns out that the turn table 12A is being rotated 360 degrees with respect to the installation surface 100 of the carrier device 1 compared to the first state (a), while the swivel arm 11 is being swiveled (revolved) 120 degrees from the first state (a). This result is obtained by rotating the turn table 12A by 240 degrees with respect to the swivel arm 11 in the same direction as the swiveling direction of the swivel arm 11. The turn table 12A is rotated 360 degrees (120 degrees+240 degrees) with respect to the installation surface 100 compared to the first state (a).

In the meantime, the turn table 12B is also rotated 240 degrees with respect to the swivel arm 11 in the same direction as the swiveling direction of the swivel arm 11, and thus is rotated 360 degrees (120 degrees+240 degrees) with respect to the installation surface 100 compared to the first state (a).

Next, when the painting operation is finished in the third state (c), the swivel arm 11 is swiveled clockwise this time and the already-painted workpiece 5 on the turn table 12B is carried to the carrying in/out position 401 that is located at the right side of the diagram. At this time, the turn table 12A goes toward the working position 410, which is newly supplied with the unpainted workpiece 5 at the carrying in/out position 402 that is located at the left side of the diagram. As described above, assuming that the state where the swivel arm 11 is being swiveled clockwise after painting is the fourth state (d), the swivel arm 11 is returned to the first state (a) after the fourth state (d). When the swivel arm is returned from the third state (c) to the first state (a), the turn tables 12A and 12B are rotated 240 degrees with respect to the swivel arm 11 in the same direction as the swiveling direction of the swivel arm while the swivel arm 11 is being swiveled (revolved) 120 degrees, and thus are rotated 360 degrees (120 degrees+240 degrees) with respect to the installation surface 100 compared to the third state (c). After that, the cycle of the first state (a) to the fourth state (d) is again repeated.

As described above, an interval from the first state (a) to the third state (c) and an interval from the third state (c) to the first state (a), namely, while the workpiece 5 just after painting is being carried, the workpiece 5 is also rotated once with respect to the installation surface 100 along with the turn table 12A (12B). Therefore, because the workpiece 5 just after painting can be prevented from being exposed to biased wind, a drying degree of the workpiece 5 is substantially equalized and a painting quality can be equally achieved.

SECOND ALTERNATIVE EXAMPLE

The swivel arm 11 of the carrier device 1 is not limited to a substantially linear shape and is not limited to a substantial V shape. For example, as illustrated in FIG. 9, three arms 11A, 11B, and 11C may be configured to radially extend at intervals of 120 degrees from the central axis that acts as the rotation center O.

Figure 9:
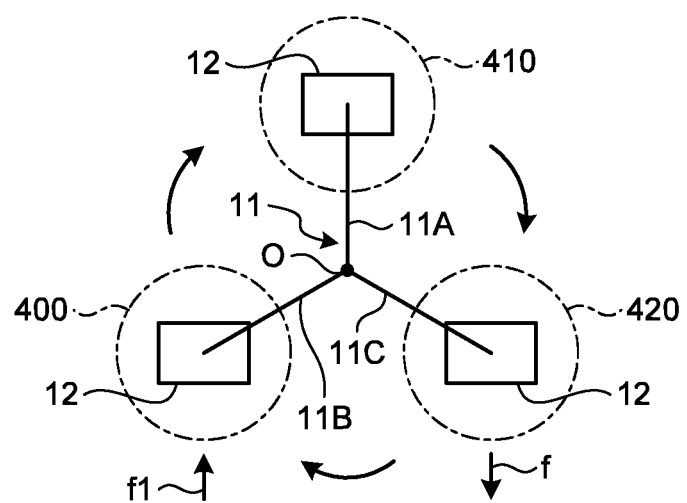
FIG. 9 is an explanation diagram illustrating revolution and rotation between the working position and the carrying in/out position of the turn table according to a second alternative example.

FIG. 9 is an explanation diagram schematically illustrating revolution and rotation between a working position and carrying out and in positions of turn tables according to the second alternative example. As illustrated in FIG. 9, the turn tables 12 are respectively attached to the three arms 11A, 11B, and 11C. Herein, each of the turn tables 12 is configured to be rotatable on its axis at its attachment position in a horizontal direction.

In this case, a carrying in position 400, the working position 410, and a carrying out position 420 are previously set clockwise at intervals of 120 degrees on the circular orbit R of the swivel arm 11. Herein, the supply of the workpiece 5 (see FIG. 1) at the carrying in position 400 is performed in the direction of an arrow f1 and the extraction of the workpiece 5 at the carrying out position 420 is performed in the direction of an arrow f2.

In other words, in this example, the carrying in/out position is divided into, on the circular orbit R, the carrying out position 420 at which the carrying out of the workpiece 5 painted at the working position 410 is performed and the carrying in position 400 at which the carrying in of the unpainted workpiece 5 is performed.

When the swivel arm 11 is sequentially revolved clockwise in units of 120 degrees like the carrying in position 400->the working position 410->the carrying out position 420, the turn table 12 can be configured to be rotated by an integral multiple of 360 degrees with respect to the installation surface 100 of the carrier device 1 (see FIGS. 2 and 3) while the swivel arm 11 is being revolved at least from the working position 410 to the carrying out position 420.

For example, assuming that the turn table 12 is rotated once (rotation of 360 degrees) with respect to the installation surface 100 while the swivel arm 11 is being revolved from the working position 410 to the carrying out position 420, the turn table 12 is consequently rotated 240 degrees with respect to the arm (11A, 11B, 11C) to which itself is attached in the same direction as the swiveling direction of the swivel arm 11 while the swivel arm 11 is swiveled 120 degrees.

Also in the case of the configuration, the workpiece 5 just after painting can be prevented from being exposed to biased wind when the painting operation is performed on the workpiece 5 on the turn table 12, for example. Therefore, a drying degree of the workpiece 5 is substantially equalized between the surfaces and thus a painting quality can be equally achieved.

As described above, the carrier device 1 according to the present embodiment has the configuration that the turn table 12 is rotated with respect to the corresponding swivel arm in the same direction as the swiveling direction of the swivel arm 11, while the turn table 12 is passing or reciprocating between the carrying in/out position 40, 401, 402 (or, the carrying out position 420 and the carrying in position 400) and the working position 41, 410 by swiveling the swivel arm 11, and, in the meantime, a sum of the rotation angle of the swivel arm 11 with respect to the installation surface 100 and the rotation angle of the turn table 12 with respect to the swivel arm 11 becomes an integral multiple of 360 degrees.

In the embodiment described above, it has been explained that the turn table 12 is rotated once with respect to the installation surface 100 while the turn table 12 is passing or reciprocating between the carrying in/out position 40, 401, 402 (or, the carrying out position 420 and the carrying in position 400) and the working position 41, 410. However, the rotation may be twice or more. At this time, because it is preferable that the posture of the turn table 12 (the posture of the workpiece 5) with respect to the installation surface 100 is not changed at the carrying in/out position (or, the carrying out position and the carrying in position) and the working position, the turn table is configured to be rotated by an integral multiple of 360 degrees with respect to the installation surface 100. Moreover, when the turn table 12 is rotated twice or more with respect to the installation surface 100, the turn table may be rotated in a direction opposite to the swiveling direction of the swivel arm 11.

Meanwhile, in the embodiment and the alternative examples described above, it has been explained that the carrier device 1 includes two or more turn tables. However, for example, the carrier device 1 may be configured to include one arm whose leading end is attached to the turn table 12 and bottom end is coupled to the base 6 to swivel freely in an interlocking manner.

According to the present embodiment, it has been explained that the robot system 3 is a system that performs a painting operation. However, the present embodiment is not limited to this. It is only sufficient that the robot system 3 is made by appropriately combining the working robot 2 that performs a predetermined operation and the carrier device 1 that has the configuration described above.

According to the present embodiment, it has been explained that the turn table 12 of the carrier device 1 has a horizontally-long rectangular shape. However, the turn table 12 may be a vertically long shape. Alternatively, the turn table 12 may be a circular form or the like. The turn table 12 is not limited to any shape.

It has been explained that the working robot 2 is placed on the top of the carrier device 1 in the robot system 3. The arrangement of the working robot 2 is not limited to the embodiment.

Figure 10:
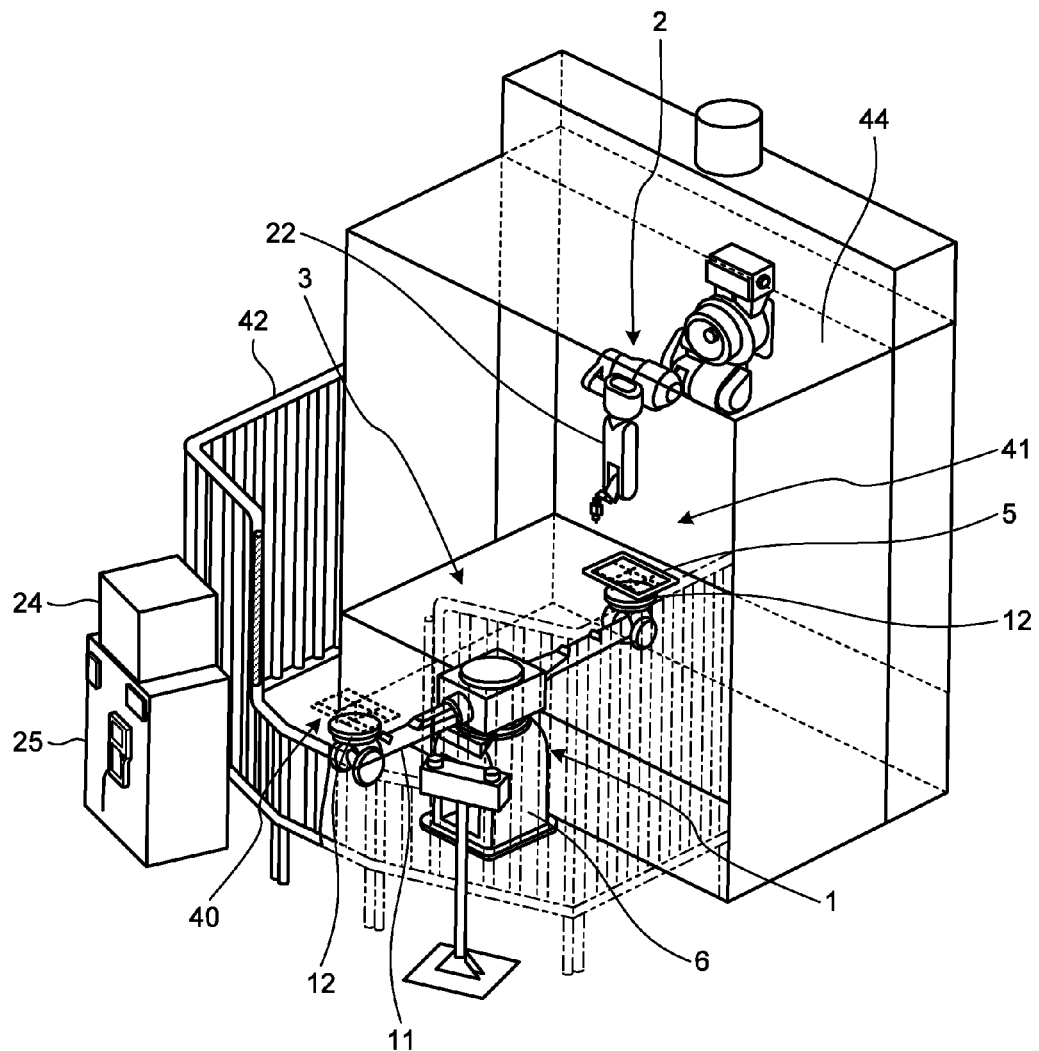
FIG. 10 is an explanation diagram illustrating a busy condition of a robot system according to another embodiment.
Figure 11:
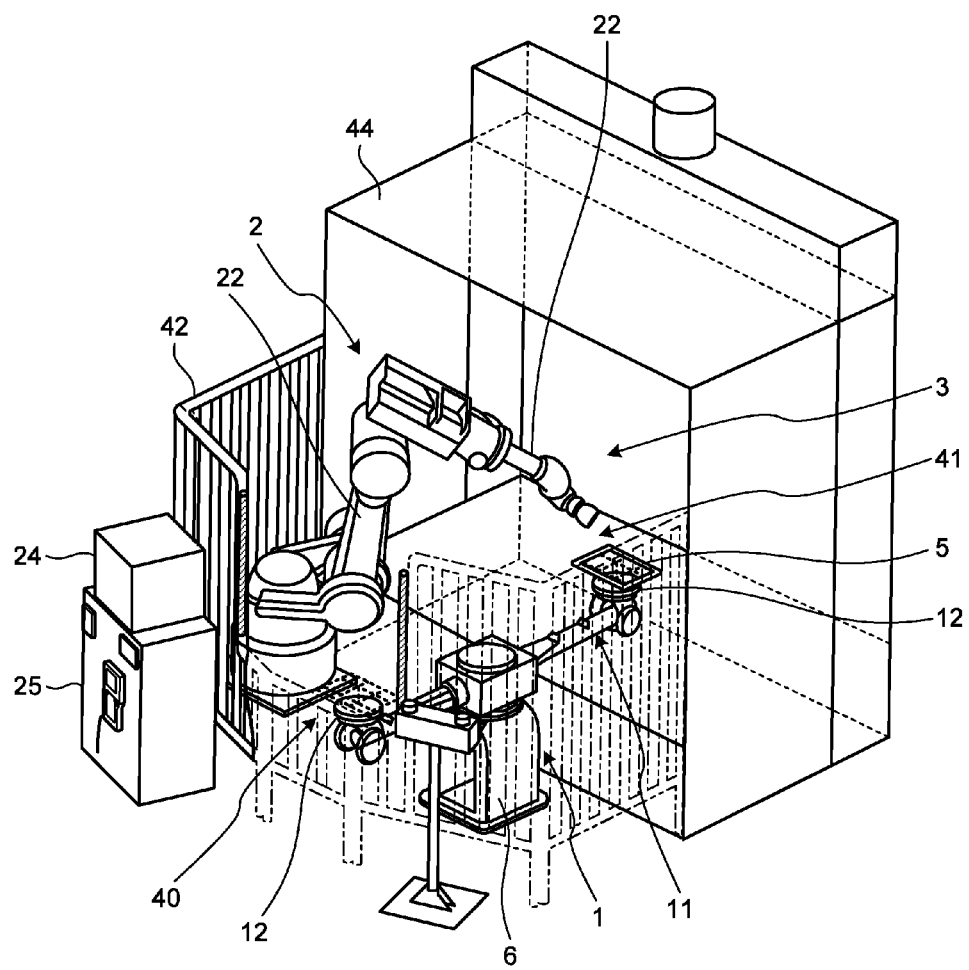
FIG. 11 is an explanation diagram illustrating a busy condition of a robot system according to still another embodiment.

For example, as illustrated in FIGS. 10 and 11, the carrier device 1 and the working robot 2 can be separately installed.

In an example illustrated in FIG. 10, the working robot 2 is placed near a ceiling 44 of the working booth 4 and the robot arm 22 is extended downward to perform a painting operation.

In an example illustrated in FIG. 11, the carrier device 1 and the working robot 2 are adjacently provided at predetermined intervals in a direction perpendicular to a direction for linking the carrying in/out position 40 and the working position 41 in the working booth 4.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A carrier device comprising:
a swivel arm that is provided on a base installed on an installation surface to be able to swivel around a central axis and whose leading ends can pass on a circular orbit; and
turn tables that are attached to the leading ends of the swivel arm and can carry a predetermined workpiece while placing thereon the workpiece between a working position and a carrying in/out position provided on the circular orbit, wherein
the turn table is rotated by an integral multiple of 360 degrees with respect to the installation surface while the turn table is moving from the working position to the carrying in/out position by swiveling the swivel arm.

2. The carrier device according to claim 1, wherein
the turn table is rotated with respect to the swivel arm in a same direction as a swiveling direction of the swivel arm while the turn table is passing or reciprocating between the working position and the carrying in/out position by swiveling the swivel arm, and
in the meantime, a sum of a rotation angle of the swivel arm with respect to the installation surface and a rotation angle of the turn table with respect to the swivel arm becomes an integral multiple of 360 degrees.

3. The carrier device according to claim 2, wherein
the working position and the carrying in/out position are located at symmetrical positions with respect to a center of the circular orbit, and
the turn tables are rotated by an integral multiple of 360 degrees with respect to the installation surface while the turn tables attached to both the ends of the swivel arm are passing or reciprocating between the working position and the carrying in/out position by swiveling the swivel arm formed substantially linearly by 180 degrees.

4. The carrier device according to claim 3, wherein the turn table is rotated 180 degrees with respect to the swivel arm in the same direction as the swiveling direction of the swivel arm while the turn table is passing or reciprocating between the working position and the carrying in/out position by swiveling the swivel arm by 180 degrees.

5. The carrier device according to claims 4, further comprising a table rotating mechanism that has a table rotating shaft that turns along an outer periphery of the base along with the swivel arm and makes the turn table rotate on its axis while the turn table is passing or reciprocating between the working position and the carrying in/out position, wherein
the table rotating shaft is provided with a leading end that is coupled to the turn table in an interlocking manner and a bottom end that is fixed to a transmission gear engaged with a guiding ring gear fixed on an outer circumferential surface of the base.

6. The carrier device according to claim 5, wherein
the base has a hollow structure and includes a hollow part into and through which a linear object including at least an electric cable can be inserted, and
a power source that drives the table rotating shaft and the swivel arm is placed outside the base.

7. The carrier device according to claims 3, further comprising a table rotating mechanism that has a table rotating shaft that turns along an outer periphery of the base along with the swivel arm and makes the turn table rotate on its axis while the turn table is passing or reciprocating between the working position and the carrying in/out position, wherein
the table rotating shaft is provided with a leading end that is coupled to the turn table in an interlocking manner and a bottom end that is fixed to a transmission gear engaged with a guiding ring gear fixed on an outer circumferential surface of the base.

8. The carrier device according to claim 7, wherein
the base has a hollow structure and includes a hollow part into and through which a linear object including at least an electric cable can be inserted, and
a power source that drives the table rotating shaft and the swivel arm is placed outside the base.

9. The carrier device according to claims 2, further comprising a table rotating mechanism that has a table rotating shaft that turns along an outer periphery of the base along with the swivel arm and makes the turn table rotate on its axis while the turn table is passing or reciprocating between the working position and the carrying in/out position, wherein
the table rotating shaft is provided with a leading end that is coupled to the turn table in an interlocking manner and a bottom end that is fixed to a transmission gear engaged with a guiding ring gear fixed on an outer circumferential surface of the base.

10. The carrier device according to claim 9, wherein
the base has a hollow structure and includes a hollow part into and through which a linear object including at least an electric cable can be inserted, and
a power source that drives the table rotating shaft and the swivel arm is placed outside the base.

11. The carrier device according to claim 1, wherein
the working position and the carrying in/out position are located at symmetrical positions with respect to a center of the circular orbit, and
the turn tables are rotated by an integral multiple of 360 degrees with respect to the installation surface while the turn tables attached to both the ends of the swivel arm are passing or reciprocating between the working position and the carrying in/out position by swiveling the swivel arm formed substantially linearly by 180 degrees.

12. The carrier device according to claim 11, wherein the turn table is rotated 180 degrees with respect to the swivel arm in the same direction as the swiveling direction of the swivel arm while the turn table is passing or reciprocating between the working position and the carrying in/out position by swiveling the swivel arm by 180 degrees.

13. The carrier device according to claims 12, further comprising a table rotating mechanism that has a table rotating shaft that turns along an outer periphery of the base along with the swivel arm and makes the turn table rotate on its axis while the turn table is passing or reciprocating between the working position and the carrying in/out position, wherein the table rotating shaft is provided with a leading end that is coupled to the turn table in an interlocking manner and a bottom end that is fixed to a transmission gear engaged with a guiding ring gear fixed on an outer circumferential surface of the base.

14. The carrier device according to claim 13, wherein
the base has a hollow structure and includes a hollow part into and through which a linear object including at least an electric cable can be inserted, and
a power source that drives the table rotating shaft and the swivel arm is placed outside the base.

15. The carrier device according to claims 11, further comprising a table rotating mechanism that has a table rotating shaft that turns along an outer periphery of the base along with the swivel arm and makes the turn table rotate on its axis while the turn table is passing or reciprocating between the working position and the carrying in/out position, wherein the table rotating shaft is provided with a leading end that is coupled to the turn table in an interlocking manner and a bottom end that is fixed to a transmission gear engaged with a guiding ring gear fixed on an outer circumferential surface of the base.

16. The carrier device according to claim 15, wherein
the base has a hollow structure and includes a hollow part into and through which a linear object including at least an electric cable can be inserted, and
a power source that drives the table rotating shaft and the swivel arm is placed outside the base.

17. The carrier device according to claims 1, further comprising a table rotating mechanism that has a table rotating shaft that turns along an outer periphery of the base along with the swivel arm and makes the turn table rotate on its axis while the turn table is passing or reciprocating between the working position and the carrying in/out position, wherein the table rotating shaft is provided with a leading end that is coupled to the turn table in an interlocking manner and a bottom end that is fixed to a transmission gear engaged with a guiding ring gear fixed on an outer circumferential surface of the base.

18. The carrier device according to claim 17, wherein
the base has a hollow structure and includes a hollow part into and through which a linear object including at least an electric cable can be inserted, and
a power source that drives the table rotating shaft and the swivel arm is placed outside the base.

19. A robot system comprising:
a carrier device according to claims 1; and
a working robot that processes the workpiece placed on the turn table at the working position.

20. The robot system according to claim 19, wherein the working robot is a painting robot that paints the workpiece and is integrally attached to the swivel arm at a substantially middle position of the swivel arm.

* * * * *